June 14, 1966  E. B. TRICKEY  3,256,070
DESUBLIMATION USING A ROTATING COOLING DRUM CONTAINING
PARTICULATE TUMBLING AND GRINDING MEDIA
Filed Oct. 12, 1960  2 Sheets-Sheet 1

INVENTOR
E. Bruce Trickey by Wenderoth, Lind & Ponack
ATTORNEYS

June 14, 1966  E. B. TRICKEY  3,256,070
DESUBLIMATION USING A ROTATING COOLING DRUM CONTAINING
PARTICULATE TUMBLING AND GRINDING MEDIA
Filed Oct. 12, 1960  2 Sheets-Sheet 2
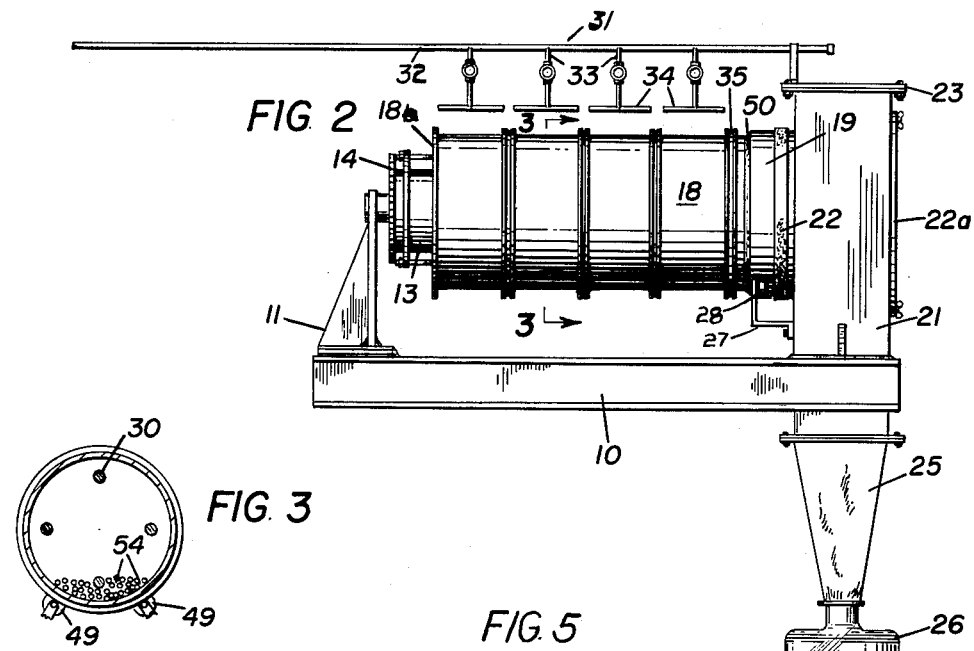
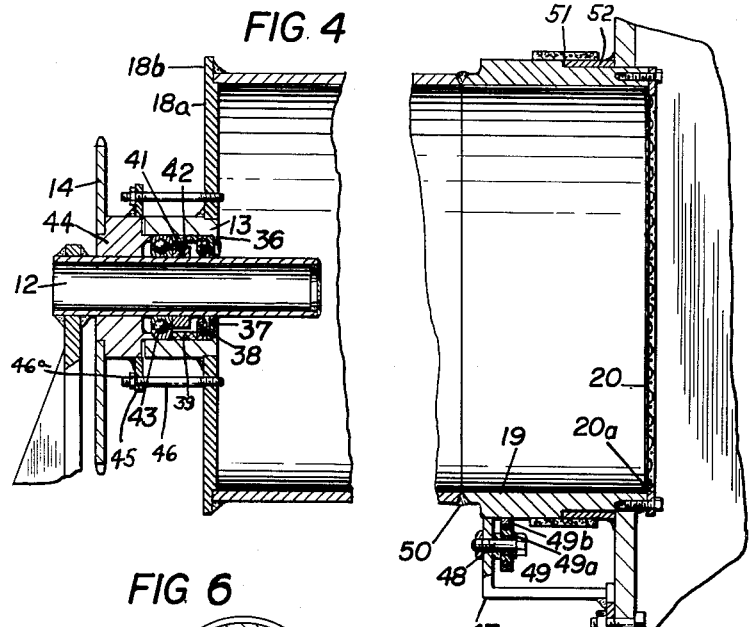
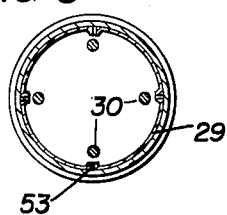
INVENTOR
E. Bruce Trickey
by Wenderoth, Lind & Ponack
ATTORNEYS United States Patent Office 3,256,070
Patented June 14, 1966

3,256,070
DESUBLIMATION USING A ROTATING COOLING DRUM CONTAINING PARTICULATE TUMBLING AND GRINDING MEDIA
Elwood Bruce Trickey, Chickasaw, Ala., assignor to Geigy Chemical Corporation, Ardsley, N.Y., a corporation of Delaware
Filed Oct. 12, 1960, Ser. No. 62,271
12 Claims. (Cl. 23—294)

This invention relates to the preparation of solid, finely divided material in high purity by desublimation. In particular, the invention relates to the continuous preparation of solid, finely divided cyanuric chloride by desublimation.

It is an object of the invention to separate pure material, which is capable of sublimation and desublimation, said material being recovered in the highly desirable physical state of fine particles in high purity. Specifically, it is an object of the invention to prepare cyanuric chloride in solid form by continuous desublimation. Other materials which are amenable to the method of continuous desublimation are also within the scope of the invention, e.g. organic material, such as naphthalene, phthalic anhydride, salicyclic acid, anthraquinone, etc., and inorganic material, such as the metal halides, aluminum chloride, etc. and also ammonium chloride, ammonium bromide, ammonium iodide, etc.

It is another object of the invention to provide an apparatus for the aforesaid continuous desublimation process.

The process and apparatus of the invention are particularly useful in the preparation of material which can be desublimed from the vapor state directly to the solid state. The usefulness of the invention will be further illustrated by the discussion and examples which follow.

In the hitherto known processes for the preparation in solid substantially pure form of desublimable material, e.g. cyanuric chloride, the product is produced in a vaporous form and has to be solidified by means of cooling, and the solid material then ground to the fineness required for further use. The vapor, e.g. cyanuric chloride, solidifies to an extremely hard almost glass-like mass which firmly adheres to all parts of the reacting chamber. It is therefore difficult to carry out the condensation of the vapor, e.g. cyanuric chloride, in the usual apparatus because of the danger of clogging the coolers, etc. In order to collect the solid material for grinding, the walls of the desublimating chamber are mechanically scraped. While in practice the solid material seems to be collected continuously, the apparatus must be shut down periodically for cleaning. In addition, the material thus collected must be ground to the proper particle size, and in practice this has been found to be rather difficult to do satisfactorily. Moreover, the mechanical removal of the hard glass-like solid, e.g. cyanuric chloride, is especially difficult when the material itself and/or other materials with which it is mixed are very strong olfactory irritants as is true of cyanuric chloride. Further, in some cases, e.g. with cyanuric chloride, the product has a very low thermal conductivity and hence almost no heat exchange takes place at cooling surfaces coated with e.g. cyanuric chloride. The discharge of the heat of condensation set free in the solidification process is the more difficult, the greater the deposit of product, e.g. cyanuric chloride. For the foregoing reasons a true continuous process for producing such substances, e.g. cyanuric chloride, in finely divided form has been impractical or impossible.

It has now surprisingly been found that many inorganic and organic materials which desublime can be prepared in powdered form by the continuous process of the invention. For example, according to the invention, cyanuric chloride is not only continuously precipitated in the apparatus according to the invention, but it is also recovered in a finely divided fluffy state without any further mechanical comminution. It is preferred to practice the invention in such a way that the conversion of vapor to solid occurs at a rate whereby no strongly adhering coatings of solid, e.g. cyanuric chloride, are formed within the cooled rotating chamber of the apparatus wherein the grinding media are placed.

A preferred embodiment of the apparatus of the present invention will now be described with reference to the accompanying drawings, in which:

FIG. 2 is a sectional elevation view of the apparatus of FIG. 1;

FIG. 3 is a cross sectional view taken along line 3—3 of FIG. 2;

FIG. 4 is a sectional elevation view, on an enlarged scale, of a detail of the apparatus of FIG. 2;

FIG. 5 is a sectional elevation view, on an enlarged scale, of a detail of the apparatus of FIG. 2; and FIG. 6 is a cross sectional view, similar to that of FIG. 3, of a modification of the apparatus of FIG. 2.

Figure 1:
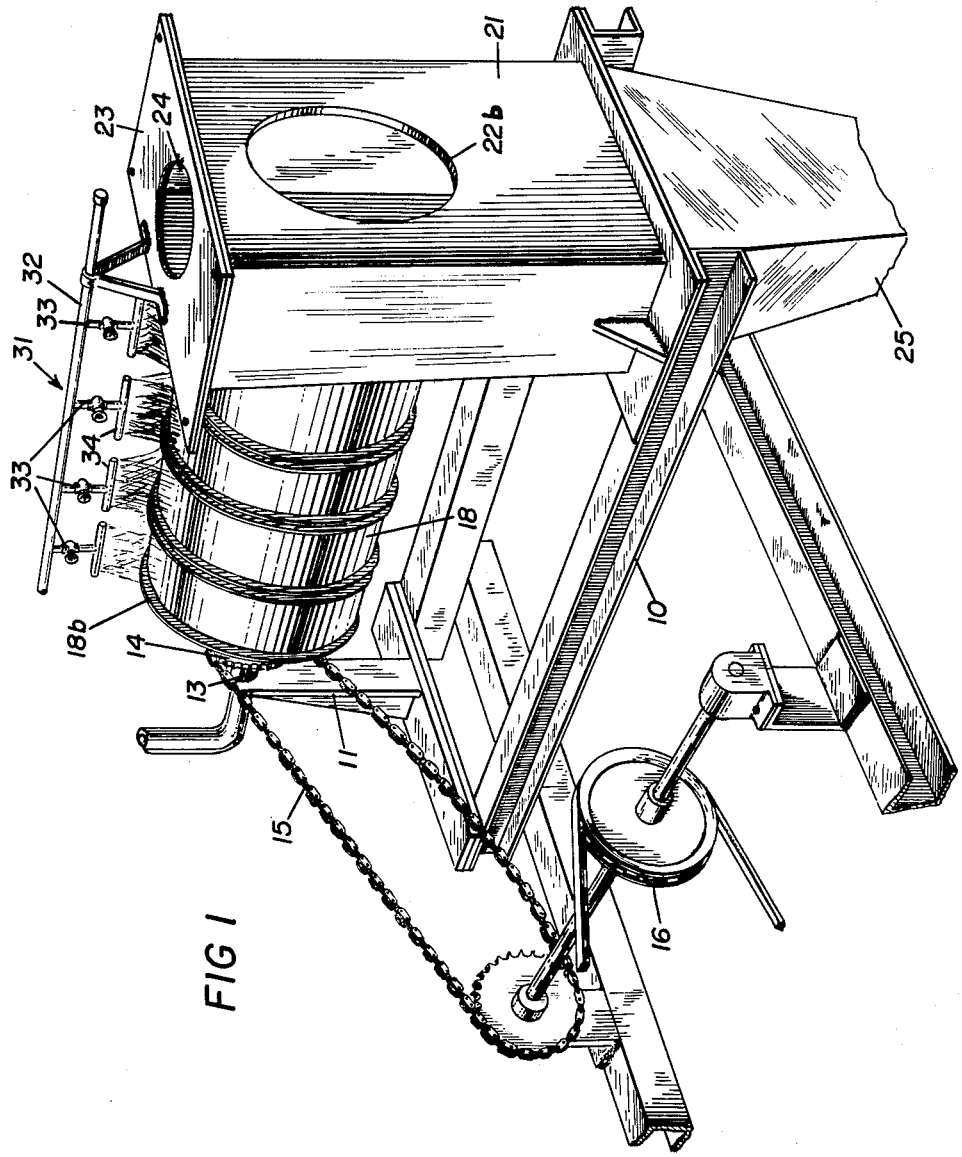
FIG. 1 is a perspective view of an apparatus in which the process according to the present invention can be carried out.

Referring to the figures, the apparatus comprises a base frame 10 of channel beams, on one end of which is secured an upright 11. Fixed on the upper end of the upright is a hollow axle 12 which extends horizontally. Positioned around the axle and rotatably mounted thereon is a bearing and seal housing 13 having a bearing and a seal therein which bear on the outside of the hollow axle 12. Secured on the bearing and seal housing 13 is a sprocket wheel 14 which is driven by a roller chain 15, which is in turn driven, through reduction pulleys and belts 16, from motor 17.

Mounted on the bearing and seal housing 13 is the end wall 18a of a drum 18 which is shown as cylindrical with its axis horizontal. At the end of the drum 18 opposite the end which is secured to the bearing and seal housing 13 the drum 18 has a bearing ring 19 therearound. The end of the drum within the bearing ring 19 is open and has a screen 20 thereacross, which is secured to the end of the drum 18 by a retaining ring 20a.

Surrounding the open end of the drum 18 is a discharge hood 21 into which the drum opens, and a felt seal 22 covers the joint between the end of the drum and the discharge hood. The discharge hood has a top 23 thereon with a vent 24 therein, which can open into a stack or other gas disposal system. The discharge hood opens downwardly and has a funnel 25 attached to the bottom thereof which empties into a collecting container 26. A circular opening is provided in the side of the hood 22b opposite the side into which the drum opens, and a cover plate 22a covers the opening.

Mounted on the side of the discharge hood 21 toward the drum 18 is a bearing mount 27, on which are mounted two roller bearings 28 on which the bearing ring 19 rolls. The bearings 28 are at a level such that the end of the drum 18 at the discharge hood 21 is supported with the axis of the drum 18 in a horizontal position.

Within the drum are a plurality of agitating rods 30, which are spaced inwardly of the liner a distance which is from $\frac{1}{10}$–$\frac{1}{8}$ the diameter of the drum. These rods may be secured at one end to the end wall 18a of the drum and at the other end to supports (not shown) which extend inwardly from the liner.

Positioned above the apparatus is a system of pipes 31 for spraying a cooling medium over the outside of the drum. These pipes include a header 32 and individually valved depending pipes 33 having spray heads 34 on the ends thereof. The cooling medium flows down over the outside of the drum 18 and falls into a collecting means (not shown) on or below the frame 10. A flange 35 is provided adjacent the bearing ring 19 to prevent cooling medium from flowing along the drum past the point at which the flange is positioned, and a further flange is provided at the end of the drum which may be formed by extending the end wall 18a as at 18b.

The details of the rotatable mounting of the drum on the hollow axle 12 are shown in FIG. 4. The bearing and sealing housing 13 is welded to the end wall 18a of the drum, and has an inwardly extending seal retaining flange 36 on the inner end thereof. Against the flange 36 is positioned a seal retaining ring 37. A seal 38 is held against the seal retaining ring 37 by an intermediate ring 39, which in turn is held in place by the action of a sealed bearing 40 bearing against it. The sealed bearing 40 is mounted on the hollow axle 12 and is held in position by a bearing retaining ring 41, fixed to the hollow tube 12 by a set screw 42, the bearing ring holding the bearing 40 against the shoulder 43 on the hollow bearing tube 12. A gland 44 bears against the opposite side of the bearing 40 from the intermediate ring 39, the gland having the sprocket wheel 14 secured thereto. The gland also has a flange 45 thereon having a plurality of bolts 46 extending therethrough and threaded into the end wall 18 of the drum. Nuts 46a on the bolts serve to draw the gland toward the drum, thus urging the bearing 40, the hollow axle 12, the intermediate ring 39, the seal 38 and the seal retaining ring 37 against the seal retaining flange 36.

The details of the bearing mounts 27 and the roller bearings 28 thereon are shown in FIG. 5. An upright bearing support 47 is welded to the frame of the bearing mount, and a bearing axle 48 is bolted to the bearing support 47. A ball bearing 49 is mounted on the bearing axle 48, one race 49a of which is fixed to the axle, and the other race 49b of which supports the bearing ring 19 on the drum.

The bearing ring 19, as seen in FIG. 5, can be formed of a separate cylindrical ring member having a radial dimension greater than the wall thickness of the drum 18. The ring can be welded to the end of the drum as at 50. The ring has a sealing flange recess 51 therein at the free end thereof, into which fits a sealing flange 52 which projects toward the drum from the discharge hood 21. The felt seal 22 overlaps the joint between the sealing flange and the bearing ring 19.

In the modification shown in FIG. 6, the agitating rods 30 are augmented by lifting bars 53, which are mounted around the inside of the drum wall and which project into the drum toward the center thereof. These serve to lift the grinding media which collect in the bottom of the drum as it rotates and lift them at least part way around the drum.

Further, the interior of the drum 18 is lined with a liner 29 of a material which is resistant to corrosion and which promotes the grinding, as will be discussed hereinafter.

Particulate grinding media 54 are provided in the drum for purposes to be discussed hereinafter with respect to their action in the process of the present invention. The material of which the grinding media are made will also be set forth hereinafter.

In the continuous process of the invention, a flow of vapor, e.g. cyanuric chloride, is continuously passed into one end of the rotating drum through the hollow axle 12, while the exterior is cooled with water from the pipe system 31. The individual pieces of the grinding media 54 will, as the drum 18 rotates tumble over and keep striking one another, and also strike the surface of the liner 29 of the drum. The vapor solidifies within the drum, the surfaces where deposits can occur being continuously kept clean by the action of the grinding media 54, which are more fully described hereinbelow striking each other and the drum liner. The finely divided solid material, e.g. cyanuric chloride, is continuously discharged into the discharge hood 22 at the end of the rotating drum opposite to the hollow axle, and the solid falls down the funnel 25 into the collecting container 26.

The grinding media not only keep the interior surface of the drum as well as the surfaces of the particles of the grinding media clean but also further grind the product, e.g. cyanuric chloride. Thus, almost all of the product, e.g. cyanuric chloride, is in the form of particles less than 40 microns. Further, the grinding media are self-cleaning.

In the process of the invention a product having a very fine particle size is obtained. The size of the particles produced ranges from about 1 micron to about 200 microns. This fine particle size represents one of the distinct advantages of the present invention, since not only high purity but a finely divided physical state is a desideratum of the invention. The particle size is closely related to the size and quantity of the grinding media, to the charge rate of the material to be purified and to the speed of rotation of the mill wherein desublimation and grinding occur. The temperature of sublimation at normal atmospheric pressure for material within the scope of the invention, e.g. cyanuric chloride, ranges from about 40° C. to about 500° C. The cooling of the drum should be so controlled as to allow almost instantaneous desublimation. Also the charge rate of the vapor to be desublimed must be so controlled as to avoid buildup of a glass like layer of solid on the interior lining 29 of the drum.

The grinding media 54 are any suitable shape such as, e.g. spheres, cubes, cylinders and irregular shapes. Irregular shapes indeed are preferred, since they have more edges which promote self-cleaning. The cube is also very useful. No shape is contemplated the effective length of which falls without the range from about one-eighth inch to about four inches. The effective length is understood to be the line having the shortest length which might be drawn through the center of the solid shape such as, e.g. the height or diameter of a cylinder, the edge dimension of a cube or the diameter of a sphere, etc. The preferred effective length is from about one-half inch to about 2 inches. The effective length is related closely to the specific gravity of the grinding medium. Lighter materials, of course, may have a larger effective length. The specific gravity of useful materials for grinding ranges from about 2 to about 11.3. It is preferable, however, to use a heavy material in quantity just sufficient to keep the walls of the drum clean and produce a product of suitable particle size. Preferred materials include nickel, iron, steel, quartz, flint pebbles and porcelain. High density ceramic materials, e.g. Burundum a synthetic sapphire substance in bond, composed of specially prepared fine grain crystals of aluminum oxide held together by a non-metallic vitreous bond (U.S. Stoneware) are useful. The so-called Ni-hard (International Nickel Co.) material is also useful: The composition of Ni-hard is iron, 90 percent; nickel, 4.5 percent; silicon, 0.6 percent; carbon, 3.4 percent and chromium 1.5 percent. Alloys, such as Hastelloy C, an alloy with the following percentage compositions: Mo, 14–19; Fe, 4–8; C, 0.04–0.15; Cr, 12–16; W, 3–5.5; remainder nickel, is also useful. In order to produce a product of high purity and low contamination, the grinding media should be chosen as to avoid the wearing away of particles therefrom.

The charge of grinding media ranges from about 3 percent effective volume to about 60 percent effective volume. Naturally, the effective volume depends to a large extent upon the specific gravity of the grinding media. The heavier the media the smaller the volume required. The effective volume is defined as follows: The grinding media to be charged which fills a 1 cubic foot box by random packing is weighed. It is essential that the grinding media be allowed to distribute itself randomly through the box without any orderly packing. The effective volume then is calculated by dividing the weight of the grinding media charged by the weight of 1 cubic food of randomly packed grinding media and multiplying the same by the reciprocated volume of the drum 18 of the desublimation apparatus. The resultant fraction multiplied by 100 yields the preferred effective volume.

The drum rotation is measured in revolutions per minute. The capacity of the apparatus is measured in pounds per hour and depends upon the drum speed, the density of the grinding media, the weight of the grinding media charged, the interior volume of the drum the roughness of the interior lining 29 of the drum. The critical speed of the cylindrical drum 18 may be measured by dividing 76.6 by the square root of the diameter of the drum in feet. It has been found that when the drum is rotated at from 30 to about 95 percent of the so calculated critical speed, good results are obtained.

The shape of the drum of the apparatus is important, and if the drum of the apparatus is cylindrical in shape the length of the cylinder should be 0.5 to 5 times the diameter of the cylinder, the preferred length of the cylinder 1.5 to 0.5 times the diameter of the cylinder.

The liner 29 of the drum of FIG. 6 is very important for obtaining a product with as little contamination as possible. In general a rather hard metal or alloy is very useful. Nickel is a preferred material for lining the drum. Other useful materials are carbon steel, titanium, Ni-hard blocks, Hastelloy C (see above) and Monel metal. In addition, the lining material is advantageously resistant to corrosion by the material to be desublimated. For example, nickel, the preferred lining, has excellent corrosion resistance to cyanuric chloride.

The following examples illustrate the invention but are not intended to limit the same thereto. In the examples, unless otherwise noted, parts are by weight and temperature in degrees centigrade. The relationship of parts by weight to parts by volume is that of pounds to cubic feet.

*Example 1*

Cyanuric chloride vapor at the rate of 9 parts per hour is passed into the desublimation apparatus illustrated in the drawing, as modified in FIGURE 6, with liner 29 being of nickel. The water-cooled drum 18 is rotated at 45 revolutions per minute. The cyanuric chloride vapor is under approximately normal atmospheric pressure within the drum and enters the drum at an initial temperature of 200°. The drum is charged with 20 parts of 13/16 inch by 13/16 inch Burundum shapes. The cyanuric chloride vapors condense within the drum and are removed by the shapes as the drum rotates. The solid cyanuric chloride passes out of the drum through the screen 20 at the end of the drum opposite to the end into which the vapors were introduced. The Burundum shapes are retained in the drum by this screen.

The cyanuric chloride solid so obtained is in a finely divided state, at least 50% of which is less than 10 microns in particle size and all of which is less than 40 microns in particle size. There are only 15 parts of nickel per million parts of cyanuric chloride.

*Example 2*

If in Example 1 the 13/16 inch by 13/16 inch Burundum shapes are replaced by 25 parts of 1¼ inch by 1¼ inch Burundum shapes, then cyanuric chloride is obtained in a finely divided state having only 16 parts of nickel per million parts of cyanuric chloride.

*Example 3*

Cyanuric chloride vapor at the rate of 9 parts per hour is passed into the desublimation apparatus (illustrated in the drawing, FIGURES 1–5) in which the drum rotates at 45 revolutions per minute. The cyanuric chloride within the drum is under approximately normal atmospheric pressure and enters the drum at a temperature of 200°. The apparatus has an unlined drum of carbon steel having a 12 inch diameter and 28¼ inch length with 4 horizontal lifting bars 53. The drum is water cooled. The drum is charged with 40 parts of steel balls each having a diameter of 1 inch. The steel balls are retained in the drum by means of the screen 20 at one end, through which the solid, finely divided cyanuric chloride passes after solidifying on the interior of the rotating drum. The product contains only 250 parts of iron per million parts of cyanuric chloride.

*Example 4*

If in Example 3, the steel balls are replaced by 90 parts of 1 inch Ni-hard balls and the feed rate of cyanuric chloride is changed from 9 parts per hour to 8 parts per hour, the cyanuric chloride solid is obtained in a finely divided state and contains only 400 parts of iron per million parts of cyanuric chloride.

*Example 5*

If in Example 3 the inside of the drum is lined with a layer of ¾ inch thick Ni-hard blocks and the steel balls are replaced by 90 parts of 1¼ inch diameter Ni-hard balls and the cyanuric chloride vapor is introduced at the rate of 4 parts per hour, then cyanuric chloride solid is obtained in a finely divided state and contains 275 parts of nickel per million parts of cyanuric chloride.

*Example 6*

If in Example 3 the interior of the drum is first polished with sand and 1 inch Ni-hard balls and the cyanuric chloride is fed into the apparatus at the rate of 5 parts per hour, then cyanuric chloride solid is obtained in finely divided state and contains 260 parts of iron per million parts of cyanuric chloride.

*Example 7*

A 6 inch length 6 inch diameter Pyrex pipe was rotated at 60 r.p.m. and cooled by blowing air on the outside. Inside the pipe there were 1424 g. of 13/16 x 13/16 inch Burundum shapes and three ¼ inch diameter steel bars coated with polyethylene tube fastened ¾ inch from the side of the walls. The hot aluminum chloride vapor was fed to one end of the pipe and a screen at the other end allowed powder to come through while retaining the Burundum shapes. With this apparatus anhydrous aluminum chloride was produced at a rate of 30 g./hr.

The product was a finely divided powder. The actual particle size is difficult to measure as the product rapidly picks up moisture from the atmosphere.

*Example 8*

An apparatus similar to that used in Example 7, but in which the Burundum shapes were replaced by 2120 grams of ¼ inch steel cubes, was used, and naphthalene vapor was introduced into one end of the pipe. Finely divided naphthalene was produced at the rate of 50 g./hr., and having the following particle sizes:

Naphthalene:

| | Percent |
|---|---|
| Below 20 micron | 70 |
| 20 to 50 micron | 20 |
| Above 50 micron | 10 |

What is claimed is:

1. Continuous process for the preparation of desublimable material in a solid, finely divided form which comprises continuously passing said material in the vapor state into a rotating drum having particulate tumbling grinding media therein at a pressure and temperature at which desublimation of the material occurs so as to cause the material to desublimate within said drum at such a rate that said grinding media comminutes the solid desublimable material continuously in its interior as soon as said material solidifies therein, and continuously discharging only the comminuted solid material from the drum.

2. Continuous process for the preparation of desublimable organic and inorganic material in a solid finely divided form, the material being selected from the group consisting of naphthalene, phthalic anhydride, salicylic acid, anthraquinone, aluminum chloride and cyanuric chloride, which comprises continuously passing said material in the vapor state into a rotating rum having particulate tumbling grinding media therein at a pressure and temperature at which desublimation of the material occurs so as to cause the material to desublimate within said drum at such a rate that said grinding media comminutes the solid desublimated material continuously in its interior as soon as said material solidifies therein, and continuously discharging only the comminuted solid material from the drum.

3. Continuous process for the preparation of cyanuric chloride in a solid finely divided form, which comprises continuously passing cyanuric chloride in the vapor state into a rotating drum having particulate tumbling grinding media therein at a pressure and temperature at which desublimation of the cyanuric chloride occurs so as to cause the cyanuric chloride to desublimate within said drum at such a rate that said grinding media comminutes the solid desublimed cyanuric chloride continuously in its interior as soon as said cyanuric chloride solidifies therein, continuously discharging only the comminuted solid cyanuric chloride from the drum.

4. Continuous process for the preparation of aluminum chloride in a solid finely divided form, which comprises continuously passing aluminum chloride in the vapor state into a rotating drum having particulate tumbling grinding media therein at a pressure and temperature at which desublimation of the aluminum chloride occurs so as to cause the aluminum chloride to desublimate within said drum at such a rate that said grinding media comminutes the solid desublimed aluminum chloride continuously in its interior as soon as said aluminum chloride solidifies therein, continuously discharging only the comminuted solid aluminum chloride from the drum.

5. Continuous process for the preparation of desublimable material in a solid finely divided form which comprises providing a rotating drum and lining said drum with a corrosion resistant material, charging the drum with a particulate tumbling grinding media, continuously passing said material in the vapor state into said rotating drum while rotating said drum and cooling the wall of said drum to cool the interior of the drum to the desublimation temperature of the material for causing the material to desublimate within said drum at such a rate that said grinding media comminutes the solid desublimable material continuously in its interior as soon as said material solidifies therein, and continuously discharging only the comminuted said solid material from the drum.

6. Process of claim 5 wherein said drum is lined with nickel.

7. Process of claim 5 wherein said grinding media comprise Burundum shapes.

8. Process of claim 5 wherein said grinding media comprise steel balls.

9. Process of claim 5 wherein said grinding media comprise Ni-hard balls and said drum is lined with Ni-hard blocks.

10. Continuous process for the preparation of cyanuric chloride which comprises providing a rotatable drum having a volume of 13,010 cu. in., lining said drum with nickel, charging said drum with a 20 lb. charge of $1\frac{3}{16}$ in. by $1\frac{3}{16}$ in. Burundum shapes, rotating said drum, continuously passing the cyanuric chloride in the vapor state into the rotating drum at about normal atmospheric pressure and at about 200° C. at the rate of about 9 pounds per hour, and continuously discharging only the solid, finely divided cyanuric chloride from the drum.

11. Continuous process for the preparation of cyanuric chloride which comprises providing a rotatable drum having a volume of 13,010 cu. in., lining said drum with nickel, charging said drum with a 20 lb. charge of $1\frac{3}{16}$ in. by $1\frac{3}{16}$ in. Burundum shapes, rotating said drum, continuously passing the cyanuric chloride in the vapor state into the rotating drum at about normal atmospheric pressure and at about 200° C. at the rate of about 9 pounds per hour, simultaneously running a liquid cooling medium over the outside of said drum, and continuously discharging only solid, finely divided cyanuric chloride from the drum.

12. A method of preparing a desublimated material, comprising passing the material in the vapor state into a space within a cooled surface cooled to the desublimation temperature of the material and thereby causing the material to desublimate within the space, simultaneously causing a plurality of particles of hard material to be tumbled within said space and against said surface to remove the solid layer and at the same time comminute the desublimated material, and continuously discharging only the comminuted material from the space.

References Cited by the Examiner

UNITED STATES PATENTS

| | | | |
|---|---|---|---|
| 1,331,964 | 2/1920 | Newhouse | 241—184 |
| 1,487,248 | 3/1924 | Lantz | 165—89 |
| 2,219,996 | 10/1940 | Livingston | 23—294 X |
| 2,608,472 | 8/1952 | Flosdorf et al. | 23—294 X |
| 2,705,186 | 3/1955 | Hardy et al. | 23—294 X |
| 2,743,996 | 5/1956 | Hachmuth | 23—273 |
| 2,925,145 | 2/1960 | Hayden | 23—87 X |
| 2,947,613 | 8/1960 | Reynolds | 23—294 |
| 3,070,601 | 12/1962 | Johnson et al. | 260—248 |

NORMAN YUDKOFF, *Primary Examiner.*

GEORGE D. MITCHELL, MAURICE A. BRINDISI,
*Examiners.*

S. EMORY, A. J. ADAMCIK, A. KIRON,
*Assistant Examiners.*